United States Patent
Rigaux et al.

(10) Patent No.: US 12,458,267 B2
(45) Date of Patent: Nov. 4, 2025

(54) MUSCLE FATIGUE DETERMINATION METHOD

(71) Applicant: MYOCENE, Liège (BE)

(72) Inventors: Pierre Rigaux, Liège (BE); Jean-Yves Mignolet, Momalle (BE)

(73) Assignee: MYOCENE, Liège (BE)

( * ) Notice: Subject to any disclaimer, the term of this patent is extended or adjusted under 35 U.S.C. 154(b) by 706 days.

(21) Appl. No.: 17/565,790

(22) Filed: Dec. 30, 2021

(65) Prior Publication Data

US 2022/0142538 A1     May 12, 2022

Related U.S. Application Data

(63) Continuation-in-part of application No. 17/342,924, filed on Jun. 9, 2021, and a continuation-in-part of application No. 17/342,903, filed on Jun. 9, 2021, which is a continuation-in-part of application No. 17/091,468, filed on Nov. 6, 2020, now Pat. No. 11,864,898, said application No. 17/342,924 is a continuation-in-part of application No. 17/091,468, filed on Nov. 6, 2020, now Pat. No. 11,864,898.

(30) Foreign Application Priority Data

Nov. 6, 2020 (BE) .................... 2020/5792

(51) Int. Cl.
*A61B 5/22*    (2006.01)
*A61N 1/36*    (2006.01)

(52) U.S. Cl.
CPC .......... *A61B 5/224* (2013.01); *A61N 1/36003* (2013.01); *A61N 1/36171* (2013.01)

(58) Field of Classification Search
CPC ................ A61B 5/224; A61N 1/36003; A61N 1/36171; A61N 1/36014; A61N 1/36031; A61N 1/36034
USPC ........................................................ 600/546
See application file for complete search history.

(56) References Cited

U.S. PATENT DOCUMENTS

| | | |
|---|---|---|
| 5,070,873 A | 12/1991 | Graupe et al. |
| 6,236,890 B1 | 5/2001 | Oldham |
| 9,114,255 B1 | 8/2015 | Hartman et al. |

(Continued)

FOREIGN PATENT DOCUMENTS

| | | |
|---|---|---|
| CA | 2 765 891 A1 | 12/2009 |
| CN | 103691059 A | 4/2014 |

(Continued)

OTHER PUBLICATIONS

Vøllestad, N. K. (1997). Measurement of human muscle fatigue. Journal of neuroscience methods, 74(2), 219-227. (Year: 1997).*

(Continued)

*Primary Examiner* — Alex M Valvis
*Assistant Examiner* — Jonathan E. Cooper
(74) *Attorney, Agent, or Firm* — CHRISTENSEN O'CONNOR JOHNSON KINDNESS PLLC

(57) ABSTRACT

A muscle fatigue determination method including a step of electrostimulating a muscle at an electric charge at different frequencies. The electric charge is determined recursively in order to generate reliable and accurate forces of the muscle in response to the electrostimulation. The method further includes the steps of determining these forces and a muscle fatigue based on them.

19 Claims, 4 Drawing Sheets

(56) References Cited

U.S. PATENT DOCUMENTS

| | | | |
|---|---|---|---|
| 9,878,152 B2* | 1/2018 | Kolen | A61B 5/389 |
| 2004/0039426 A1* | 2/2004 | Hurtado | A63B 23/0244 |
| | | | 607/48 |
| 2005/0283204 A1* | 12/2005 | Buhlmann | A61B 5/4519 |
| | | | 607/48 |
| 2005/0283205 A1 | 12/2005 | Lee et al. | |
| 2006/0270943 A1 | 11/2006 | Kamataki et al. | |
| 2010/0069796 A1* | 3/2010 | Duncan | A61N 1/36003 |
| | | | 600/595 |
| 2014/0058476 A1* | 2/2014 | Crosby | A61N 1/36003 |
| | | | 607/48 |
| 2014/0067010 A1 | 3/2014 | Sumners et al. | |
| 2017/0181689 A1* | 6/2017 | Lin | A61B 5/1107 |
| 2017/0209087 A1 | 7/2017 | Buhlmann et al. | |
| 2017/0340278 A1 | 11/2017 | Imhauser | |
| 2017/0347941 A1 | 12/2017 | Ejiri et al. | |
| 2018/0296831 A1 | 10/2018 | Matsushita | |
| 2019/0022388 A1* | 1/2019 | Stucke | A61N 1/36031 |
| 2019/0223764 A1* | 7/2019 | Hulvershorn | A61B 5/24 |
| 2020/0179695 A1 | 6/2020 | Bergh et al. | |
| 2022/0331602 A1 | 10/2022 | Dzialecka et al. | |

FOREIGN PATENT DOCUMENTS

| | | | |
|---|---|---|---|
| CN | 107468255 A | 12/2017 | |
| CN | 110522999 A | 12/2019 | |
| CZ | 2018-559 A3 | 3/2020 | |
| JP | 4110771 B2 | 7/2008 | |
| JP | 5916154 B2 | 5/2016 | |
| KR | 101685013 B1 | 12/2016 | |
| WO | 1990/006152 A1 | 6/1990 | |
| WO | 2002/013696 A1 | 2/2002 | |
| WO | 2020/078486 A1 | 4/2020 | |

OTHER PUBLICATIONS

Douma, K. W. et al.; "Reliability of the Q Force; a mobile instrument for measuring isometric quadriceps muscle strength"; BMC Sports Science, Medicine and Rehabilitation; 2016; pp. 1-12; vol. 8, No. 4.

Edwards, R. H. T. et al.; "Fatigue of Long Duration in Human Skeletal Muscle After Exercise"; Journal of Physiology; Mar. 23, 1977; pp. 769-778; vol. 272.

Ruggiero, Luca et al.; "Prolonged low-frequency force depression is underestimated when assessed with doublets compared with tetani in the dorsiflexors"; Journal of Applied Physiology; Mar. 14, 2019; pp. 1352-1359; vol. 126; American Physiological Society.

Verkerke, G. J. et al.; "Precision, comfort and mechanical performance of the Quadriso-tester, a quadriceps force measuring device"; Medical & Biological Engineering & Computing; May 2003; pp. 283-289; vol. 41.

Martin, V.; "Assessment of low-frequency fatigue with two methods of electrical stimulation"; Journal of Applied Physiology; Jul. 11, 2004; pp. 1923-1929; vol. 97; American Physiological Society.

Chiu, Loren Z.F. et al., "The Fitness-Fatigue Model Revisited: Implications for Planning Short- and Long-Term Training," Strength and Conditioning Journal, Dec. 2003, pp. 42-51, vol. 25, No. 6, National Strength & Conditioning Association.

International Search Report and Written Opinion mailed Aug. 16, 2022, issued in corresponding International Application No. PCT/EP2022/061932, filed May 4, 2022, 16 pages.

Kirsch, Nicholas A., "Control Methods for Compensation and Inhibition of Muscle Fatigue in Neuroprosthetic Devices," Doctoral Dissertation, University of Pittsburgh; Mar. 21, 2016; 176 pages.

"Kyowa Load Cells Complete Catalog," Test Machines Australia, Aug. 2021, 59 pages, located at https://testmachines.com.au/wp-content/uploads/2021/08/Kyowa-Load-Cells-Complete-catalog.pdf.

Silva, Miguel T. et al., "An efficient muscle fatigue model for forward and inverse dynamic analysis of human movements," Procedia IUTAM, 2011, pp. 262-274, vol. 2, Elsevier Ltd.

Zhang, Dingguo et al., "Cooperative Control for A Hybrid Rehabilitation System Combining Functional Electrical Stimulation and Robotic Exoskeleton," Frontiers in Neuroscience, Dec. 21, 2017, pp. 1-16, vol. 11.

Binder-Macleod, Stuart A; Halden, Esther E.; Jungles, Kimberly A., "Effects of stimulation intensity on the physiological responses of human motor units," Medicine & Science in Sports & Exercise, Apr. 1995, pp. 556-565.

Wang, H. et al., "An electrical muscle simulator based on functional electrical stimulation," 2012 IEEE International Conference on Robotics and Biomimetics (ROBIO), Guangzhou, China, 2012, pp. 1906-1911.

Zhang, Q. et al., "Torque prediction using stimulus evoked EMG and its identification for different muscle fatigue states in SCI subjects," 2010 Annual International Conference of the IEEE Engineering in Medicine and Biology, Buenos Aires, 2010, pp. 3523-3526.

* cited by examiner

MUSCLE FATIGUE DETERMINATION METHOD

This application is a continuation-in-part of U.S. patent application Ser. No. 17/342,903, filed on Jun. 9, 2021, which is a continuation-in-part of U.S. patent application Ser. No. 17/091,468, filed on Nov. 6, 2020, and also claims priority to Belgian application BE2020/5792, filed on Nov. 6, 2020, the disclosures of which are incorporated herein by reference. This application is also a continuation-in-part of U.S. patent application Ser. No. 17/342,924, filed on Jun. 9, 2021, which is a continuation-in-part of U.S. patent application Ser. No. 17/091,468, filed on Nov. 6, 2020, and also claims priority to Belgian application BE2020/5792, filed on Nov. 6, 2020, the disclosures of which are incorporated herein by reference.

TECHNICAL FIELD

This disclosure relates to a muscle fatigue determination method.

BACKGROUND

Animal activities, in particular human activities, induce "fatigue". Such fatigue can be nervous (i.e., induced by intellectual or psychic activities) and/or physical (i.e., induced by physical work). A physical fatigue is called a "muscle fatigue" because it results from a muscular work and leads to a decrease in the force that can be provided by the affected muscle(s). In particular, muscle fatigue can result in an incapacity to maintain and/or repeat a physical effort.

The identification, measurement and/or monitoring of muscle fatigue play an important role, for example, in sport practices (e.g., for the purpose of training effectiveness optimization, injury prevention, individual sport training program conception, muscle readiness, . . . ), as well as in physiotherapy for muscle rehabilitation (e.g., for the purpose of exercise monitoring, treatment optimization, excessive treatment prevention, . . . ).

A known method for assessing such muscle fatigue of a subject is to perform a test requiring maximum voluntary contraction of said muscle (e.g., by voluntary movements), repeated several times. A muscle fatigue is deemed to be identified if a predetermined maximal muscular force corresponding to a monitored data (such that time, speed, force, power, acceleration, . . . ) cannot be reached. The subject motivation for reaching such a maximum contraction of the muscle can however affect such muscle fatigue evaluation. This test also induces a significant muscle fatigue, so that it affects the results obtained by the method. In particular, the test cannot be reproduced several times, and it cannot be performed after an intense muscle work. The method has further the drawback to put the subject at risk of injury.

In order to solve the above-mentioned problems, the U.S. application Ser. No. 17/091,468 provides a muscle fatigue determination method, comprising the following steps:
(i) electrostimulating the muscle at different frequencies;
(ii) determining forces developed by the muscle in response to the electro-stimulations of step (i);
(iii) determining a muscle fatigue on basis of the forces determined at step (ii).

This method uses electrostimulations at steps (i) in order to stimulate involuntary the muscle whatever its fatigue and its conditions, without putting the subject at risk of injury. The muscle fatigue can then be easily determined at step (iii) because the muscle fatigue makes the forces measured at step (ii) varying non-uniformly with respect to the frequency of electrostimulation. This method is advantageous as it does not require any comparison to a subject standard data, preliminary measures, or specific execution conditions.

The muscle fatigue determined from step (iii) may however be marred by errors from the forces determination at step (ii). For example, in the case of forces determination by a measuring instrument, the lower the measured force is and the greater the measurement error is. This may be due typically to the measuring instrument sensitivity limit. Moreover, the same electrostimulation in the same conditions of a same muscle on two different subjects may lead to two very different forces determination as a function of the muscle itself. For example, an old subject, a high body index or any muscular alterations (e.g., atrophy) reduces the forces determined at step (ii). In some cases, these factors may affect the forces determined at step (ii) in such way that these forces become low in comparison of errors occurring from the determination technics (e.g., from a measuring instrument sensitivity), so that making the muscle fatigue determination inaccurate.

It is desirable to provide a more accurate and reliable muscle fatigue determination method.

Subject Matter Disclosure

An object of the disclosed subject matter is to provide a reliable and more accurate method for determining a muscle fatigue. For this purpose, the disclosed subject matter provides a method for determining a muscle fatigue of a muscle, the method comprising the following steps in the following order:
(a) setting an electric charge and a muscular forces target interval;
(b) electrostimulating the muscle with an isolated pulse at the electric charge;
(c) determining a force developed by the muscle in response to the electrostimulation of step (b);
(d) if the force determined at step (c) does not belong to the muscular forces target interval:
  (d.1) comparing the force determined at step (c) with the muscular forces target interval,
  (d.2) modifying the electric charge depending on the comparison of substep (d.1), and
  (d.3) repeating steps (b) to (d);
(i) electrostimulating the muscle at the electric charge at different frequencies;
(ii) determining forces developed by the muscle in response to the electrostimulations of step (i);
(iii) determining the muscle fatigue on basis of the forces determined at step (ii).

The method according to the present disclosure is reliable and more accurate for determining the muscle fatigue than the method described in the U.S. application Ser. No. 17/091,468, while reproducing all its advantages.

Indeed, steps (i) to (iii) of this method are part of the method of the disclosed subject matter and yield to the muscle fatigue determination at step (iii). In particular, the method is then efficient, safe and flexible for determining the muscle fatigue thanks to the use of electrostimulations at steps (i) which allows to stimulate the muscle whatever its fatigue and to make the muscle developing an involuntary force in response to the electrostimulations. This step can be performed at any time, also after a sport training, without putting the subject at risk of injury. It is not dependent on the subject will to urge any maximal contraction of the muscle. Step (i) also does not induce a significant muscle fatigue as the number of electrostimulations are preferably limited and performed shortly, in order to observe muscle reactions and to determine the forces at step (ii). The muscle fatigue determination at step (iii) is efficient as it benefits from the fact that the muscle fatigue deforms non-uniformly the curve of the force developed by the muscle in response to an electrostimulation at a frequency as a function of this frequency. It is then possible easily to determine the muscle fatigue at step (iii) based on at least two points on this curve. Such a muscle fatigue determination is independent from the execution context of the method. No comparison to a such standard curve at rest for the subject, no preliminary measures, and no restricted execution conditions are needed.

The reliable and accurate features of the present method originate from the taking into account of a new parameter: the electric charge.

Each electrostimulation of step (i) comprises a repetition of pulses at one of the frequencies. The "electric charge" is then typically defined by the pulses electric intensity, and/or by individual pulse duration (or pulses width), and/or by a pulses voltage for a fixed electrical current. In this document, the electric charge preferably corresponds to the pulses electric intensity, so that any modification of the pulses electric charge (as hereafter) preferably solely corresponds to a modification of the pulses electric intensity. This preferred embodiment does not exclude another kind of "electric charge" from the scope of the disclosed subject matter, as it can be understood from the genericity of the terms "electric charge". In particular, a modification of the electric charge may also be obtained by modifying one or more pulses parameters among: the electric intensity, the voltage or the width for a fixed electrical current.

As it is specified at step (i), the electrostimulations are generated at a specific electric charge issued from new steps (a) to (d) of the method. In the method, the electric charge is initially used as a recursive parameter in steps (b) to (d). The electric charge set at step (a) consists for instance in a generic or medium electric charge (e.g., a pulse electric intensity of 15, 20 or 25 mA). It is mainly used to initialize the recursion. The recursion induced by steps (b) to (d) aims at determining an appropriate pulses electric charge for executing steps (i) to (iii) while avoiding the drawbacks of the prior art.

More specifically, the relevance of using the electric charge as set at step (a) for electrostimulating the muscle at step (i) is tested through a single isolated pulse at step (b). This pulse is used to observe a muscle response in order to determine a force developed by the muscle at step (c). This force is then evaluated as satisfying or not for executing steps (i) to (iii), in the sense that it is not too low and/or too high in view of the muscle nature (e.g., subject age, body mass index and/or muscular alteration) and/or force determination technics used (e.g., sensitivity of a measuring instrument used at step (ii)).

This evaluation is made very simply in the disclosed subject matter by setting a muscular forces target interval at step (a). The latter aims at defining a range of acceptable (strictly positive) forces that could be obtained at step (b) in view of the execution of steps (i) to (iii), depending on the muscle (and then on the subject) and/or on a system used to implement the method (e.g., on a measuring instrument sensitivity). This interval is then typically at least semi-bounded, i.e., bounded only lower, only upper, or both.

Preferably, the muscular forces target interval comprises (at least) a lower bound. It corresponds typically to a minimal acceptable force for being highly reliable considering the sensitivity determination technics used at steps (c) and (ii). In addition, advantageously this lower bound is sufficiently high to render negligible potential perturbations that can appear during steps (c) and (ii) execution, such as voluntary contractions or external vibrations, so that the error on the forces determined at those steps are minimized.

Nevertheless, these forces should not be so strong that they make the execution of the method uncomfortable for the subject. In particular, the lower bound should be fixed sufficiently high to make the force determination reliable and sufficiently low to keep the method execution sufficiently comfortable for the subject. For instance, such lower bound can be 3N, 4N, 5N, 6N, 7N, 8N, 9N or 10N depending on the muscle and the force determination technics. For instance, if a lower bound of 8N may be convenient for a quadriceps as the muscle of a medium subject (in age, in body mass index, and without muscle alteration), a lower bound of 4N may be better for a biceps as the muscle of the same subject. In any case, this lower bound depends on the determination technics used for determining the forces at steps (c) and (ii). An adapted lower bound is preferably at least, and more preferably around 5N. The lower bound is more generally comprised between 2 and 10 N.

In order to keep the method execution comfortable for the subject, the muscular forces target interval can comprise an upper bound. For instance, the upper bound can be 50N, 60N, 70N, 80N, 90N or 100N depending on the muscle (and then on the subject) and/or on the force determination technics, as for the lower bound. Although the muscular forces target interval preferably comprises a lower bound, the case of such an interval with a sole upper bound as described is not excluded from the scope of the disclosed subject matter.

The data of a muscular forces target interval is equivalent to the data of its lower and/or upper bounds if any, so that setting this interval at step (a) can be equivalently rephrased by setting such bounds, and checking at step (d) if the force determined at step (c) belongs to the interval can be rephrased by checking if this force is smaller than (or equal to) the upper bound, if any, and greater than (or equal to) the lower bound, if any. The interval can be half-open, half-closed, open or closed, and/or bounded or semi-bounded, for the usual topology on real numbers. As it will be understood, the terms "or equal to" hereabove apply for an interval closed at the considered bound.

Stet (d) of the method defines the recursion on the electric charge. In particular, if the electric charge used for electrostimulating the muscle at step (b) provides a force comprised in the muscular forces target interval, i.e., which is reliable in view of the system used to implement the method (e.g., in view of the sensitivity of a forces measuring instrument), and in view of the subject, it can then maintained for executing steps (i) to (iii). If not, the electric charge is modified at substep (d.2) with respect to the comparison from substep (d.1) of the force determined at step (b) with the muscular forces target interval set at step (a). An embodiment of such a comparison is provided hereafter.

The charge step modification aims at correcting the unreliability of the force determination, and then to improve the muscle fatigue determination at step (iii). This modified charge step becomes then the charge step used for a new occurrence of steps (b) to (d) as induced at substep (d.3). The steps (b) to (d) allow then advantageously to determine recursively the electric charge to be used at steps (i) to (iii), in order to reduce progressively the unreliability on the force determination which improves the accuracy and the reliability of the muscle fatigue determination method originally defined from steps (i) to (iii). In particular, the "electric charge" used at the first occurrence of step (i) is either the electric charge as set at step (a) or the electric charge as modified at the last occurrence of step (d.2), according to the recursion.

Typically, the electric charge used at the first occurrence of step (i) is comprised between 25 and 40 mA while the electric charge initially set at step (a) is generally comprised between 15 and 30 mA. It may be then preferred to set an electric charge of 25 mA at step (a). These data are not limiting in the scope of the disclosed subject matter. In particular, the electric charge set at step (a) is more generally comprised between 10 and 40 mA.

As mentioned hereabove, steps (c) and (ii) are preferably performed by a measuring instrument arranged for measuring the forces to be determined at step (c) and (ii). In this case, the electric charge and/or the muscular forces target interval set at step (a) depend on the muscle and/or on at least one technical feature of the measuring instrument.

It is particularly advantageous to adapt the electric charge via steps (b) to (d) before step (i). Indeed, if the electric charge was adjusted during the electrostimulations of step (i) that would impose useless electrical impulsions that could affect the muscle fatigue determination by generating an electrical fatigue and/or a potentiation (as it will be explained hereafter), while being a discomfort for the subject.

As explained hereabove, the electric charge is preferably defined by an electric intensity of pulses constituting the electrostimulations (of steps (b) and (i)), in such a way that the modification of the electric charge at substep (d.2) corresponds to a modification of the electric intensity. The latter has the advantage to be easy to modify and to monitor during the method execution. The electric intensity, or more generally, the electric charge, corresponds to a quantity of motor units or muscle fibers on which the method is applied, so that it affects muscle responses to the electrostimulations.

It is described below a preferred embodiment of substeps (d.1) and (d.2) for modifying the electric charge before the first occurrence of step (i). In this embodiment, the comparison of substep (d.1) comprises a determination of a ratio of a reference force of the muscular forces target interval to the force determined at step (c). This ratio is easy to compute while providing a precise information on the distance in proportion between the force determined at step (c) and the reference force, and then the interval. Optionally, the data of this reference force may be equivalent to the data of the interval. It is the case, for instance, if the reference force is always chosen as the middle of a bounded interval, or as the lower bound of a half-bounded interval.

The reference force is preferably a lower bound or an upper bound of the muscular forces target interval. If the reference force corresponds to the interval lower (resp. upper) bound, and if the force determined at step (c) is lower (resp. upper) than the lower (resp. upper) bound, the ratio is indicative of a proportion to apply to the electric charge at substep (d.2) for providing a force within the interval at the following occurrence of step (c).

For an electric charge corresponding to the pulses electric intensity, the inventor discovered that this ratio corresponds exactly to the modification to apply to the electric charge given that the force developed by the muscle in response to the electrostimulation of the muscle with an isolated pulse at the electric charge varies mainly linearly with respect to the electric charge. This linearity has followed from statistic regression with an high correlation index. Therefore, the modification of the electric charge is preferably determined at substep (d.2) by the formula E'F=E F' where:

E is the electric charge,
E' is the modified electric charge to be determined,
F is the force determined at step (c), and
F' is the reference force.

As it can be noticed, the ratio computation of substep (d.1) is implicit from this formula. The formula has the main advantage to allow to obtain an appropriate electric charge for executing steps (i) to (iii) with two (or at most three) occurrences of steps (b) and (c), which renders the method efficient in the case of the electric charge corresponding to the electric intensity.

This formula may also generalize for other "electric charge" as the ratio of substep (d.1) remains at least indicative of the modification of substep (d.2) as explained above. In an alternative way, other more complex function than such a linear function (the coefficient of which is defined by the ratio of substep (d.1)) can also be used for defining the modification of the electric charge at substep (d.2). However, such function can render more difficult and slow the execution of the method.

A numerical example is hereby provided. If the electric charge set at step (a) is 15 mA, if the force determined at step (c) is 3N and if the muscular force target interval is the closed semi-bounded interval [5N, +∞[, considering the lower bound 5N as the reference force, the ratio of substep (d.1) is 5/3 and the modified electric charge is 25 mA. By testing this electric charge through a new occurrence of steps (b) and (c), as induced by the substep (d.3), a force newly determined at step (c) should be close to 5N. As the reference force is chosen as a bound of the interval, taking into account error due to sensitivity of the force determination technique or other external perturbation, the force determined at this second occurrence of step (c) may still be lower than 5N, then out of the interval. In this case, a third occurrence of step (b) and (c) is induced by step (d). For instance, if this new force is 4.5N, a ratio of 10/9 from substep (d.1) is applied to the current electric charge of 25 mA. The modified electric charge is then 28 mA (rounded to the unit). A third occurrence of steps (b) and (c) is then executed, yielding then finally a force of 5.5 N at step (c). As this force belongs to the interval, step (d) is not executed anymore and step (i) can be executed with this electric charge.

As it can be deduced from this example, it can be more advantageous to use a reference force that is close to the lower bound without corresponding exactly to this lower bound to avoid this third occurrence of steps (b) and (c). Indeed, if the reference force was chosen as 6N, the modified electric charge would have been 30 mA and the force determined at the second occurrence of step (c) would have been certainly directly greater than 5N. That is why, more generally, the reference force is preferably chosen among: a lower or a upper bound of the interval, a lower bound increased by a force step, or an upper bound decreased by a force step. Preferentially, such a "force step" is comprised between 1 and 5N, e.g., it is 1N, 2N, 3N, 4N or 5N.

Alternatively to the preferred embodiment described in detail above, other implementations of substep (d.1) and (d.2) are fully part of the scope of the disclosed subject matter. For an example of such other implementations, substep (d.1) may comprises determining if the force determined at step (c) is greater of smaller than all the forces comprised in the muscular forces target interval, and substep (d.2) may consist in decreasing or increasing the electric charge by a predetermined step (e.g., 0.5, 1, 2, 3, 4 or 5 mA)

respectively in each of these cases. Considering the preceding numerical example with such a step of 1 mA, given that the value 3N is smaller than all the forces of the interval [5N, +∞[, the electric charge would be increased by 1 mA, so that the modified electric charge would be 16 mA for the second occurrence of steps (b) and (c). In this case, the force determined at the second occurrence of step (c) with this electric charge would not be sufficient. The same for the third, the fourth, etc. occurrences. About 14 occurrences of steps (b) and (c) would be necessary to reach the electric charge of 28 mA in this way.

This other implementation of substeps (d.1) and (d.2) is very simple and systematic. It does not require any real computation. Nevertheless, it can take more time for being executed.

In any case, step (d) defines a recursion on steps (b) to (d), and the modification of electric charge at substep (d.2) is typically made recursively.

The method according to the present disclosure is convenient for a wide range of applications, in particular for determining muscle fatigue of sport professionals before, during or even after a training or a competition, as well as muscle fatigue of injured and/or elderly people during muscle rehabilitation.

The determination method according to this disclosure is particularly convenient for planning sports training. The method according to the present disclosure is generally not planned to be applied to a curative purpose and is not intended to identify or uncover a pathology. In this respect, an embodiment of the disclosed subject matter can read as follows:

a method for planning a sport activity, comprising the following steps:
(a) setting an electric charge and a muscular forces target interval;
(b) electrostimulating the muscle with an isolated pulse at the electric charge;
(c) determining a force developed by the muscle in response to the electrostimulation of step (b);
(d) if the force determined at step (c) does not belong to the muscular forces target interval:
 (d.1) comparing the force determined at step (c) with the muscular forces target interval,
 (d.2) modifying the electric charge depending on the comparison of substep (d.1), and
 (d.3) repeating steps (b) to (d);
(i) electrostimulating the muscle at the electric charge at different frequencies;
(ii) determining forces developed by the muscle in response to the electrostimulations of step (i);
(iii) determining at least one muscle data information on basis of the forces determined at step (ii);
(v) planning the sport activity on basis of the muscle data information.

Preferably, all, any, part, or at least one of the muscle data information determined at step (iii) is used at step (v) for planning the sport activity.

Preferably, the sport activity is a sport training. Preferably, the muscle data information comprises (or optionally consists in) a muscle fatigue (data).

This method for planning a sport activity is non-curative and/or non-medical and/or non-therapeutic. In particular, step (v) does not aim at deriving a curative diagnostic. Preferably, the step (v) comprises (or optionally consists in) determining a time data depending on the muscle data information.

If the muscle data information comprises (or optionally consists in) a muscle fatigue (data), this sport activity planning method can be rephrased as comprising the following steps:
(0) identifying a muscle to be stimulated during the sport activity;
(1) executing the method according to the present disclosure for determining a muscle fatigue (or at least one muscle fatigue data information) of the muscle identified at step (0); and
(2) planning the sport activity on basis of the muscle fatigue (or at least one muscle fatigue data information) determined at step (1).

In other words, the step (1) corresponds to the preceding steps (a) to (iii). The muscle fatigue (data information) determined at step (1) is preferably obtained from all, any, part, or at least one of the muscle fatigues (data) that are determined at the different occurrences of step (iii), more preferably, by an averaging of all these muscle fatigues (data).

More generally, the method according to the present disclosure, can also correspond to a non-curative and/or non-medical and/or non-therapeutic determination method of a muscle fatigue of a muscle, comprising the steps (a) to (iii). In such a case, no curative diagnostic is derived from step (iii).

Any of the preceding and following embodiments and advantages of the method according to the present disclosure as generically stated at the beginning of the present disclosure applies mutatis mutandis to the specific particular case of the method above disclosed, and in particular to the sport activity planning methods and any non-curative embodiments. In particular, any one of the embodiments presented in the claims can be considered alone or in combination with these methods.

Another general benefice of the determination method of the present disclosure is that it allows to determine specific muscle fatigues. Indeed, the muscle fatigue depends on many physiologic factors. In particular, the muscle fatigue can be caused by a deficiency of a neuromuscular neurological control when the latter is not able to stimulate anymore muscle fibers to a maximum potential (leading to a so-called "central muscle fatigue"), or by alteration of the contraction force at direct level of the muscle fibers (leading to a so-called "peripheral muscle fatigue"). In the framework of the present disclosure, the determination method allows to determine directly at step (iii) the peripheral muscle fatigue given that the electrostimulations of step (i) affect directly of the peripheral muscle fibers, independently from the central neurological control of the muscle contraction. The method can however optionally also comprise a central muscle fatigue determination, e.g., by a subtraction of the determined peripheral muscle fatigue from another global fatigue measurement.

Moreover, the peripheral muscle fatigue comprises itself two kinds of muscle fatigues depending how long the muscle fatigue affects the muscle: the so-called "short-lasting peripheral muscle fatigue" that is essentially linked to energetic and/or metabolic factors, from which it can be recovered quickly (i.e., after some minutes), and the so-called "long-lasting peripheral muscle fatigue" that persists for several hours and even several days (e.g., after a signification physical effort).

The muscle fatigue determined at step (iii) is preferably a long-lasting peripheral muscle fatigue. Optionally, a short-lasting peripheral muscle fatigue can also be determined from the method by an additional determination of the muscle fatigue in an interval of time following the execution of the method of the present disclosure, and subtraction of the obtained results.

In the framework of this disclosure, the term "electrostimulation" and any of its variants preferably refer to neuromuscular electrical stimulation or any kind of stimulation of the motor neurons of the tested muscle. Such a stimulation is preferably performed by a stimulator comprising a stimulator comprising a generator of electric pulses and electrodes adapted to be placed on the subject skin, at proximity and/or beside the muscle, and connected to the generator in such a way that a current can be transmitted to the muscle by the electrodes. The stimulator preferably comprises a controller for selecting electrostimulations parameters such as the intensity and the frequency of the electric pulses. Such a stimulator is known by a skilled person.

In the framework of this disclosure, each "force" determined at step (ii) corresponds preferably to a maximal force developed in response to the whole pulses of an electrostimulation of step (i) at one of the frequencies. Similarly, each "force" determined at step (c) corresponds preferably to a maximal force reached in response to the isolated pulse of an electrostimulation of step (b).

In the framework of this document, the use of the indefinite article "a", "an" or the definite article "the" to introduce an element does not exclude the presence of a plurality of these elements. In this document, the terms "first", "second", "third" and the like are solely used to differentiate elements and do not imply any order in these elements. In this document, the terms "at level of" and "at the level of" are used equivalently. In the framework of this document, the terms "on basis of" and "on the basis of" are used equivalently. The latter are moreover not limitative: the fact that a first quantity is determined on basis of a second quantity do not exclude that the first quantity can be determined on basis of a third quantity together with the first quantity.

In the framework of this document, the use of the verbs "comprise", "include", "involve" or any variant, as well as their conjugational forms, cannot exclude the presence of elements other than those mentioned. When the verb "comprise" is used for defining an interval by the terms "comprised between" two values, these two values should not be interpreted as excluded from the interval.

In the framework of this document, the use of the terms "preferable," "preferably", "preferred," and is not to be considered as limiting with respect to the scope of the disclosed subject matter or in regard to claim interpretation. More specifically, the inclusion of a "preferred" limitation or embodiment in the disclosure is not intended to limit the scope of claimed subject matter to only include the "preferred" embodiments. In this regard, the inclusion of "preferred" embodiments should not be interpreted to signal a surrender of subject matter not identified as such.

For further improving the accuracy and reliability of the method of the disclosed subject matter, it is proposed below another preferred embodiment of the method fully compatible with any preceding embodiments. According to this preferred embodiment, the method comprises a number of occurrences of a step (iv) after step (iii). Step (iv) comprises the following substeps:

(iv.1) increasing the electric charge by a charge step,
(iv.4) repeating steps (i) to (iii).

This step (iv) proposes then to modify further the charge step defined from steps (a) to (d) but after the first occurrence of step (i). This modification is made by adding systematically a charge step to the current electric charge between two occurrences of step (i). For instance, considering the preceding numerical example, and a number of 10 occurrences of step (iv), this means that steps (i) to (iii) are firstly executed with the electric charge of 28 mA, then secondly executed with the electric charge of 29 mA, etc. till and eleventh execution of steps (i) to (iii) with the electric charge of 38 mA.

Step (iv) allows to improve the method global accuracy and reliability because it allows to obtain a wide range of determinations (e.g., measures) of forces at step (ii) and the muscle fatigues at step (iii). This repetition of steps (i) to (iii) allows in particular to averaging these data and to make sure that the muscle fatigue is correctly determined with an extremely low error margin.

Nevertheless, a repetition of steps (i) to (iii) makes necessary to deal with a muscular physiological phenomenon which is called "potentiation" (or post-activation-potentiation, staircase phenomenon, posttetanic potentiation) as known and described in the scientific literature on muscular physiology.

This phenomenon is defined as the effect of prior muscular activity on the enhancement of subsequent muscle contraction. Muscle activity produces muscle fatigue and also potentiation, which is the opposite phenomenon to peripheral muscle fatigue. Potentiation therefore coexists with muscle fatigue and can more or less compensate for it. This phenomenon of potentiation is obtained with all kind of muscular activity. Therefore, when performing muscle electrostimulation of step (i) in order to determine muscle fatigue, an electro-induced muscle contraction generates a potentiation of the muscle fibers which masks muscle fatigue and disturbs its determination. The latter disturbance is all the more important as the electrical stimulation pulses are numerous and repeated within a period of time.

In order to mitigate or even avoid this potentiation, step (iv) does not only proposed to repeat steps (i) to (iii) but also to increase the electric charge defined from steps (a) to (d) between two occurrences of step (i). Indeed, this gain in electric charge makes it possible to involve new muscle fibers at each occurrence of step (i) that are not potentiated by preceding electrostimulations. As a consequence, the spatial recruitment of muscle fibers is modified at each occurrence of step (i) induced by step (iv).

Step (iv) combines then both the advantage of improving the method accuracy by repeating steps (i) to (iii) and the advantage to strongly mitigate the muscle potentiation, so then to improve efficiently the method accuracy.

Preferably, each electrostimulation of step (i) comprises a repetition of pulses with an electric intensity comprised between 10 and 100 mA, wherein the increasing of the electric charge at substep (iv.1) consists in an increasing of the electric intensity of the pulses. In this case, the pulse increases from a lower value to a higher value of electric intensity, both between 10 and 100 mA. The lower value is determined recursively by steps (a) to (d). It is typically comprised between 15 and 40 mA, and more preferably, it is about 25 mA to 30 mA, in order to have a smooth first electrostimulation feeling at step (i) for the subject. The higher value is preferably comprised between 30 and 60 mA, more preferably, it is about 40 mA to 50 mA, in order to avoid too high stress for the muscle.

Preferably, the charge step expressed in terms of electric intensity is comprised between +0.5 and +5 mA. More preferably it is about +1 mA, such step values being sufficient for electrostimulating enough different muscular fibers from one occurrence of steps (i) to (iii) to the other, and then to mitigate potentiation.

Preferably, the number of occurrences is comprised between 5 to 30, more preferably between 10 and 20. For instance, it can be about 15 in order to obtain enough determinations (e.g., measures) of forces and muscle fatigue and then to have a very low error margin from the method.

According to a non limitative exemplary embodiment of step (iv), the electric charge defined from steps (a) to (d) is progressively increased by 15 charge steps of +1 mA through step (iv). Such an increase in intensity makes it possible to recruit each time a new layer of muscle fibers which is not affected by the electrostimulations of the previous occurrence of step (i) and is therefore not yet potentiated. This renders the method even more precise and easy to implement.

According to a preferred embodiment of the method, step (iv) further comprises the following substep between substeps (iv.1) and (iv.4): (iv.2) executing steps (b) and (c).

Again, this formulation of substep (iv.2) has to be understood with considered "electric charge" at each execution of this substep. For instance, following the preceding numeral example, the first occurrence of substep (iv.2) induces then an execution of steps (b) and (c) with an electric charge of 28 mA.

This substep (iv.2) induces an electrostimulation by an isolated pulse between two occurrences of steps (i) to (iii). Advantageously, the consecutive muscular response as well as the force determined at this occurrence of step (c) can be used for deducing and/or measuring and/or monitoring muscular data information during the repeated execution of steps (i) to (iii) and/or for adapting this execution.

Such a muscular data information that it is particularly advantageous to monitor is the time duration for the muscle to develop the force in response to the electrostimulation of step (b) following an occurrence of substep (iv.2). Indeed, as explained below this time duration can be used for monitoring the homogeneity of the recruited muscle fibers over repeated executions of step (i) at increasing electric charges.

A human muscle such as a quadriceps comprises two kinds of fibers: "slow muscle fibers" and "fast muscle fibers". On one hand, slow muscle fibers develop a low level of force, contract slowly, but they have mainly an oxidative metabolism and they are resistant to fatigue. On the other hand, fast muscle fibers develop high level of force, contract rapidly, but have mainly a glycolytic metabolism and are not resistant to fatigue.

It is then relevant to wonder if the proportion of slow and fast muscle fibers remain the same during electrostimulations of the muscle at increasing electric charges induced by step (iv). Indeed, if the proportion of recruited fast and slow muscle fibers varies as a function of the electric charge during the execution of the method, this would affect the muscle fatigue determination at step (iii) given that they have a different resistance to fatigue.

A way to monitor this parameter during the execution of method is to determine (e.g., to measure) the time necessary for the muscle to develop (i.e., to reach) the force determined at step (c) in response to a electrostimulation by an isolated pulse. Indeed, as the slow and fast muscle fibers also develop their force at different speeds, a variation of this time can be interpreted as a variation of the proportion of electrostimulated slow and fast muscle fibers.

That is why step (c) preferably comprises determining a time duration for the muscle to develop the force in response to the electrostimulation of step (b). In this case, step (iv) preferably comprises the following substep between substeps (iv.2) and (iv.4):

(iv.3) comparing the time duration determined at the occurrence of step (c) originating from the preceding substep (iv.2) to the time duration determined at the last occurrence of step (c) preceding the first occurrence of step (i).

It is then advantageously possible to compare continuously an original time duration associated with the occurrence of steps (b) and (c) yielding to a validation of the electric charge to be used for the first occurrence of step (i) with the time duration obtained from an electrostimulation by an isolated pulse at a newly increased electric charge. This allows to detect a potential change in homogeneity of the recruited muscle fibers over repeated executions of step (i) which could affect the reliability of the muscle fatigue determination.

In practice, this time duration is generally comprised between 50 and 100 ms, depending on the subject slow and fast muscle fibers proportion. As an example, it can be 60, 70, 80 or 90 ms.

The execution of the method may be stopped after any occurrence of substep (iv.3) following which the time durations compared at substep (iv.3) deviate from at least 10 ms, more preferably from at least 5 ms. Indeed, in this case, the proposition of recruited slow and fast muscle fibers over repeated executions of step (i) varies too much for the muscle fatigue determination to be reliably validated.

According to another preferred embodiment of the present disclosure, any electrostimulation of step (i) at any frequency is preceded and/or followed by a rest period of at least 300 ms. This applies whether substep (iv.2) (or more generally step (iv)) is executed or not as part of the method.

This rest period is advantageous as it may mitigate (or better avoid) disturbances from an electrostimulation (of substep (iv.2) or step (i)) to another electrostimulation (of substep (iv.2) or step (i)). Such disturbances may be due for instance to a muscular "tetanisation", i.e., a fusion of the curves of the forces developed by the muscle as a function of time, in response to each of two electrostimulations too close in time. The minimal bound of 300 ms is chosen to allow at least an almost full return of the muscle to normal and/or relaxed conditions (i.e., without contraction or residual force developed) between two successive electrostimulations.

This allows to determine directly the force developed by the muscle at each occurrence of step (ii) for each of the frequencies of step (i), and at each occurrence of step (c) originating from substep (iv.2), with very low, or without determination disturbances.

Advantageously, the rest period also contributes to mitigate the above introduced potentiation, increasing then further the accuracy and the reliability of the muscle fatigue determination. Indeed, spacing apart in time successive electrostimulations reduces the number of electrical impulses per unit of time, and then reduces also the potentiation on the muscle fibers recruited by these electrostimulations.

Values such as 2/5, 3/5, 4/5, 1, 6/5, 7/5, 8/5, 9/5, 2, 3, 4 or 5 seconds for the rest period are preferred because, on one hand, they are great enough to strongly mitigate (and even avoid) the above-mentioned disturbances and said potentiation, and on the other hand, they are short enough to make the execution of the method sufficiently short and easily applicable in an overall short period of time.

Different rest periods according to the preceding disclosure may apply. For instance, a first rest period can apply between two electrostimulations of the same occurrence of step (i). Then, a second rest period can apply after a whole execution of step (i). Finally, a third rest period can apply between an execution of step (b) originating from substep (iv.2) is any, and an execution of step (i). Any of these rest periods contributes to mitigate or avoid the above-mentioned disturbances, but the second rest period is the one with the most major impact on this and on the potentiation mitigation or avoidance. That is why the second rest period is preferentially greater than the first and/or third rest periods. Preferably, the second rest period is 330 ms or more, while the first and third rest periods are 300 ms or more. More preferably, this second rest period is 1 second or more, while these first and third rest periods are 0.5 second or more. For instance, the second rest period is about 5 seconds, and the first and third rest periods are about 1 second.

In particular, in the framework of this disclosure, the term "isolated" used at step (b) refers to the fact that the isolated pulse is separated in time from any other pulse of any other electrostimulation, and preferably sufficiently separated for the muscular response to the isolated pulse to be achieved or at least almost achieved (i.e., with an almost full return of the muscle to normal and/or relaxed conditions). Preferably, this pulse is separated by at least 300 ms, more preferably by at least 1 second, from any other electrostimulation of steps (b) and (i).

According to a preferred embodiment of the present disclosure, it is proposed an additional way of increasing the reliability and the accuracy of the muscle fatigue determination of step (iii). According to this embodiment, each electrostimulation of step (i) at each frequency lasts at most 500 ms. In other words, the repetition of pulses at each of the frequencies of step (i) is made during short a period of time of at most 500 ms.

This short period of time is so short that it advantageously allows to avoid voluntary or reflex disturbance of the subject who can, otherwise, either increase the force by taking part with a muscle contraction, or on the contrary decrease it by contracting an antagonist muscle to the muscle. This renders forces determination at step (ii), and then the whole method execution, more accurate and reliable. This short period of time moreover still allows to reach to the same maximal force to be determined at step (ii) at each frequency, as would have been the case by repeating the pulses at each frequency during more than 500 ms. This short period of time also advantageously reduces the overall time of execution of the method.

Preferably, the short period of time is further comprised between 150 and 250 ms. For instance, it is 200, 210, 220, 230, 240 or 250 ms. The above-mentioned advantage are strengthen at a short period of time of 250 ms.

It can be pointed out that an exact time period data T (in seconds) is equivalent to an exact number N of pulses data at a given frequency p (in Hz). Those numbers are satisfying the formula $T=N/\mu$. Preferably, the pulses are repeated between 5 and 20 times during each electrostimulation of step (i) at each of the frequencies.

According to a representative embodiment of the present disclosure, the frequencies mentioned at step (i) are comprised between 0 and 200 Hz.

Such upper bound mitigates muscle fatigue induction by an execution of the determination method. Preferably, the frequencies comprise a first frequency $\mu_1$ and a second frequency $\mu_2$. The first frequency differs preferably by at least 10% from the second frequency in the sense that $\mu_2-\mu_1 \geq \mu_2/10$.

This difference between the frequencies is advantageous in order to ensure that two points on the curve of the force developed by the muscle in response to an electrostimulation at a frequency in function of this frequency are sufficiently spaced one from the other for performing more accurately step (iii). This follows from the non-uniformity and non-linearity of the deformation of this curve depending on a preexisting muscle fatigue. The forces developed by the muscle in response to electrostimulations at low frequencies (such as between 0 and 50 Hz) are indeed much more affected by this muscle fatigue than the forces developed by the muscle in response to electrostimulations at higher frequencies (such as between 50 and 200 Hz).

That is why the above-mentioned difference $\mu_2-\mu_1$ is more preferably at least 20%, and again more preferably at least 50%, of the second frequency $\mu_2$. Preferably, the first frequency is comprised between 0 and 50 Hz and/or the second frequency is comprised between 50 and 200 Hz. Preferably, the first frequency is about 20 Hz and/or the second frequency is about or 120 Hz. Any other similar couple of values for the first and second frequencies can be used, for example: 10 and 50 Hz, 20 and 100 Hz, 30 and 80 Hz, 50 and 150 Hz, etc.

According to theses embodiments, the electrostimulation frequencies used at step (i) preferably only consist in the first and the second frequencies. Advantageously, it is possible to determine the muscle fatigue at step (iii) only by considering these two forces as it is explained hereafter. The advantage is to avoid muscle fatigue induction by limiting the electrostimulations at step (i) in number and frequency. Another advantage is to facilitate the execution of step (iii) by considering only a limited number of data. As an example, step (i) may consist in:

electrostimulating the muscle with a repetition of 3, 4, 5, or 6 pulses at a first frequency of about 10, 15, 20 or 25 Hz during a short period of time comprised between 150 and 250 ms;

electrostimulating the muscle with a repetition of 16, 17, 18 or 19 pulses at a second frequency of about 100, 110, 120 or 130 Hz during a short period of time comprised between 150 and 250 ms.

The disclosed subject matter however is not limited to frequencies consisting in only the first and second frequencies. Other numbers of frequencies can be considered such as three, four, five, six, seven, eight, or more frequencies, and these frequencies can also be equidistant in a range of frequency.

According to a preferred embodiment of the present disclosure, step (iii) preferably comprises:

a comparison of the forces determined at step (ii), and a determination of the muscle fatigue based on this comparison.

In the above-mentioned cases of frequencies comprising a first and a second frequency, the forces determined at step (ii) then comprise:

a first force developed by the muscle in response to the electrostimulation of step (i) at the first frequency, and a second force developed by the muscle in response to the electrostimulation of step (i) at the second frequency;

and preferably, step (iii) comprises the following substeps:

(iii.1) computing a ratio of the first force to the second force, (iii.2) comparing the ratio computed at substep (iii.1) to a threshold, and (iii.3) determining the muscle fatigue on basis of the comparison of substep (iii.2).

In particular, substeps (iii.1) and (iii.2) are then a preferred implementation of the above-mentioned comparison of forces.

This particular implementation of step (iii) allows an easy, fast and low complexity computation for determining the muscle fatigue. It is also very efficient. Indeed, as the first frequency differs from at least 10% of the second frequency, the ratio is affected by the non-uniformity of the aforementioned curve deformation in function of the muscle fatigue. Any difference identified at substep (iii.2) may therefore underlie a muscle fatigue that can further be determined at least implicitly and more preferably explicitly, in particular for a threshold corresponding to an expected ratio for a non-fatigued muscle, The threshold to which a ratio of the first force to the second force is compared, consists preferably in a number $F(\mu_1)/F(\mu_2)$, where:
- F is a human independent increasing regular function expressing a force developed by a non-fatigued muscle in response to an electrostimulation as a function of a frequency of this electrostimulation;
- $\mu_1$ and $\mu_2$ are respectively the first and the second frequencies.

Expressing the ratio in this way is advantageous because it is human independent and indirectly given through the function F for any couple of the first and second frequencies. This embodiment is not limitative of the scope of the disclosed subject matter. It is not necessary to consider a whole function F for the above-mentioned embodiment involving only the first and the second frequencies, as a number corresponding to these frequencies is sufficient.

As an example, the first frequency may be comprised between 10 and 40 Hz, the second frequency may be comprised between 90 and 130 Hz, and the threshold may be comprised between 40 and 90%. More preferably, the first frequency is about 20 Hz, the second frequency is about 120 Hz, and the threshold is about 60%, or 65%, or 70%, or 75%, or 80%.

In the framework of the present document, the terms "determining", "determine", "determination" and any other variants correspond preferably to the terms "quantifying", "quantify" and "quantification" in the sense that the muscle fatigue is preferably not just identified but explicitly measured and/or computed. For example, in the preceding embodiments, an explicit measure and/or computation can be derived by a computer from the comparison of the computed ratio to the threshold and/or from determined muscle fatigue averaging. The scope of step (iii) nevertheless preferably does not exclude a determination of the muscle fatigue based on other physical quantities at least partially derived from the forces determined at steps (c) and/or (ii), such as, for instance, associated torques. Reciprocally, steps (c) and (ii) do not exclude a determination of the forces that can be based on physical quantities related to the forces that can be measured in response to the electrostimulations of steps (b) and (i), such as, for instance, displacements, accelerations, and/or torques.

According to another disclosed embodiment of the method, the forces are determined in steps (c) and (ii) by direct force measurements, preferably by means of a strain gauge or a dynamometer. In particular, the determination of the forces at steps (c) and (ii) is done directly, by measuring the forces (in Newton), by appropriate technologies and not by any intermediate or indirect measures and/or observations (such as by electromyography) nor deduction or estimation inducing an increasing risk of forces determination error. These direct force measurements are preferably performed by a dedicated muscular force measuring device introduced hereafter.

Preferably, the muscle involved consists in a muscle of a lower limb of a human (i.e., the subject). Preferably, this muscle consists in the quadriceps or the hamstring. In these cases, according to a representative embodiment of the present disclosure, the method comprises the following steps before step (a):
(α) providing a system comprising:
  a stimulator for generating the electrostimulations of steps (b) and (i), comprising a controller for selecting electrostimulations parameters;
  a muscular force measuring device comprising:
    seat adapted to receive the human in a seated position and to be positioned on a horizontal support,
    a leg support element adapted to receive and to maintain stable at least part of a leg of the lower limb,
    a measuring instrument adapted to measure the forces to be determined at steps (c) and (ii) at the level of the leg support element in response to the electrostimulations generated by the stimulator at steps (b) and (i), and
    a mechanical structure mechanically coupling the seat and the leg support element, and comprising a connecting member to the measuring instrument at level of the leg support element; and
  a logical unit:
    connected to the measuring instrument so that the logical unit is adapted to receive measurements of the forces to be determined at steps (c) and (ii) from the measuring instrument, adapted to receive the electric charge and the muscular forces target interval set at step (a), and
    configured for executing substeps (d.1) and (d.2) and step (iii) from the electric charge and the muscular forces target interval set at step (a) and from the forces measured by the measuring instrument at steps (c) and (ii);
(β) positioning the seat on the horizontal support;
(γ) positioning the human on the seat in the seated position, and positioning at least part of the leg on the leg support element, so that the lower limb is only in direct external physical contact with the muscular force measuring device.

As it will be understood by the skilled person, the system provided at step (α) is fully designed and configured for executing the steps of the method of the present disclosure. In particular, preferably, the electric charge and the muscular forces target interval set at step (a) are received by the logical unit, the electrostimulations of steps (b) and (i) are generated by the stimulator, and the forces determined at steps (c) and (ii) are measured by the measuring instrument. In addition, preferably, the comparison of substep (d.1), the modification of the electric charge of substep (d.2) and the determination of the muscle fatigue of step (iii) are performed by the logical unit based on the electric charge and the muscular forces target interval set at step (a) and on the forces measured by the measuring instrument at steps (c) and (ii). The logical unit may also be connected to the stimulator and/or its controller for algorithmically activating the stimulator and/or selecting electrostimulations parameters.

Said electrostimulations parameters preferably at least comprise the electrostimulation frequency, the electric charge and the number of pulses of each electrostimulation.

Preferably, the electrostimulation frequency can vary in a range of frequencies, e.g., between 0 and 200 Hz. Preferably, the electric charge selection at least comprises pulses electric intensity selection. These electrostimulations parameters may also comprise the above-mentioned first, second and/or third rest periods. The controller can preferably be configured for executing a predetermined electric charge program related to the method. Alternatively, this execution can be performed under the control of the logical unit as described hereabove.

The use of the muscular force measuring device for executing steps (c) and (ii) is particularly advantageous. This device is very simple and easy to move, while allowing to determine the forces at steps (c) and (ii) directly with a great accuracy. The execution of steps (b) and (i) is also made very simple as the human is seated on the seat, his leg being positioned and maintained stable in the leg support element as mentioned at step (γ).

Preferably, as the lower limb is only in direct external physical contact with the muscular force measuring device:
  a foot of lower limb hangs in an air; and/or, preferably and,
  a whole thigh of the lower limb lies on the seat; and/or, preferably and,
  a back of a knee of the lower limb is in contact with a lateral side of the seat.

Advantageously, this allows to know perfectly the measurement conditions of the forces at steps (c) and (ii) and then to make the forces determination more accurate and reliable as physical perturbations (e.g., those induced by a force exerted by the foot on a support such as the ground) are avoided. Preferably, the human is positioned at steps (b) and (c) such that its back is straight and form a substantially right angle with the lower limb thigh. Thanks to the simple structure of the device and the easy positioning of the human, the measures of the forces by the measuring instrument are reproducible. This is advantageous for the purpose of the disclosed method because muscle fatigue determined at step (iii) can be compared from a day to another, whenever and wherever, provided that the seat can be positioned on a horizontal support, without the necessity of executing the method in the same place and in the same conditions, and without taking care of a multiplicity of positioning parameters of the human.

Preferably, the muscular force measuring device remains stationary with respect to the horizontal support during an execution of steps (b), (c), (i) and (ii) thanks to a whole weight of the human exerted at level of the seat. In particular, no complex nor heavy structure is needed for receiving the human and executing the method. A simple plane coupled to the leg support element by a mechanical structure can be used as seat and positioned on a horizontal support such as a table or another seat, anywhere, as mentioned at step (P). In particular, the human has not to go to a specific medical or sport center for determining his muscle fatigue. The seat is preferably wide enough to position fully a person seated on it. It extend continuously preferably on at least 40 cm, preferably at least 50 cm or at least 60 cm, along two perpendicular axis.

By receiving, and not simply supporting the leg part, the leg support element allows to maintain the part of the leg in position, ensuring precise and reproducible measurements of the force, for instance as it was described. The leg support element preferably comprises a semi-cylindrical hollow portion for conforming to the curvature of the part of a leg while laterally immobilizing this part of the leg. The leg support element can also comprise a strap for better immobilizing the part of the leg.

As mentioned above, the measuring instrument is connected mechanically to the mechanical structure at the level of the leg support element, so that to measure the forces to be determined at steps (c) and (ii) at the level of the leg support element. The measuring instrument is typically aligned with the forces direction, so that to measure directly and accurately these forces. It is aligned with the leg support element, and may form a single piece with the latter, so that in other words, it is directly fixed to the leg support element. As mentioned above, the measuring instrument is preferably a strain gauge or a dynamometer. It can be arranged for working either in traction or in compression, so that reproducible, direct and accurate measurements of the forces can be performed.

The mechanically structure preferably consists in a mechanical arm or a mechanical frame. Advantageously, the structure of the device is then very simple and light. The arm or the frame can have a simple form, for example a projected form of "I", "L", "T", "U", "S" or "Z" in at least one plane orthogonal to the seat, and preferably comprising at least a high extremity coupled with (or fixed to) the seat, and at least a low extremity coupled with (or fixed to) the leg support element. The device may comprise position adjustment elements for modifying a position and/or an orientation of the mechanical structure with respect to the seat, and/or a position and/or an orientation of the leg support element with respect to the mechanical structure. Such position adjustment element can comprise any mechanical element well known by a person skilled in the art such as a screw, a bolt, a pin, a spring, etc. preferably configured for cooperating with the mechanical arm or frame, for example, within cavities.

The muscular force measuring device consists preferably only in the seat, the leg support element, the measuring instrument, the mechanical structure, and position adjustment elements if any. It is then reduced to a very simple and practical form, while allowing to implement steps (c) and (ii) of the method in an accurate way for determining the muscle fatigue.

The disclosed subject matter also provides the system as described in detail above as a system for determining a muscle fatigue of a muscle, which is also adapted for implementing the disclosed method. All the embodiments of the method according to the present disclosure and the advantages of these embodiments apply mutatis mutandis to the present system according to the present disclosure. In particular, this system allows for a reliable and accurate muscle fatigue determination as discussed previously.

The disclosed subject matter is further introduced in the claims. As it will be understood by a skilled person from the present disclosure, any one of the embodiments presented in these claims can be considered alone or in combination. In particular, the dependency of the claims can be considered in a broader manner so that any one of the possible combinations of the claims—as far as they are technically possible and understood by the person skilled in the art, in particular in view of the present disclosure—are part of the present application.

DRAWINGS DESCRIPTION

Other characteristics and advantages of the disclosed subject matter will appear on reading the following detailed description, for the understanding of which, it is referred to the attached figures where:

Figure 1:
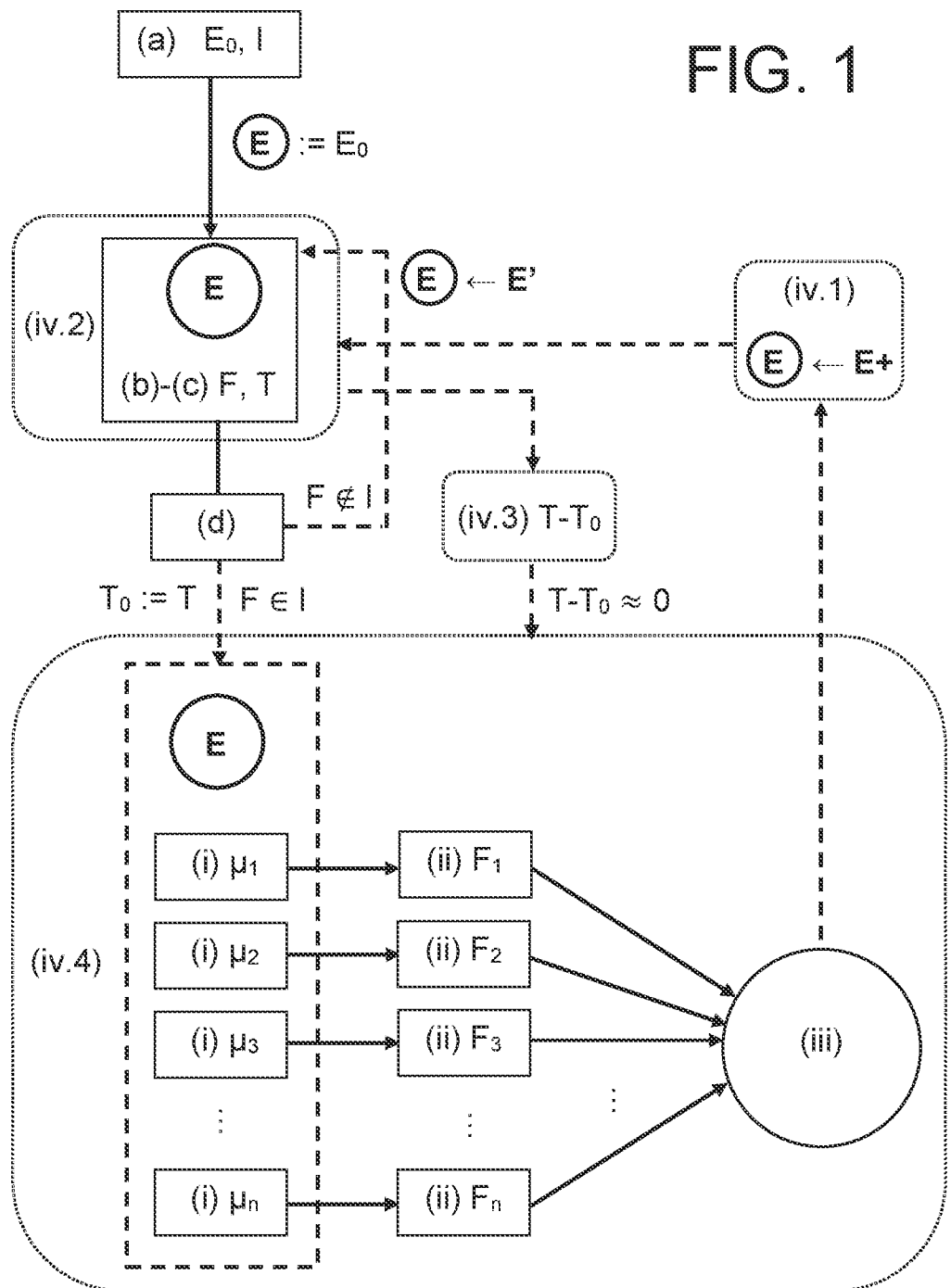
FIG. 1 illustrates a flow chart of the method according to a representative embodiment of the present disclosure.

The drawings in the figures are not scaled. Similar elements can be assigned by similar references in the figures. In the framework of the present document, identical or analogous elements may have the same references. The presence of reference numbers in the drawings cannot be considered to be limiting, in particular if these numbers are indicated in the claims.

DETAILED DESCRIPTION

Description of representative embodiments of the disclosed subject matter are hereafter described with references to figures, but the present disclosure is not limited by these references. In particular, the drawings or figures described below are only schematic and are not limiting in any way.

As shown in FIG. 1, the illustrated muscle fatigue determination method proposes to electrostimulate a muscle at different frequencies $\mu_1, \mu_2, \mu_3, \ldots, \mu_n$ at step (i), in order to determine, and preferably to measure, the respective (maximal) forces $F_1, F_2, F_3, \ldots, F_n$ developed by the muscle in response to each of the electrostimulations respectively at each frequencies $\mu_1, \mu_2, \mu_3, \ldots, \mu_n$ at step (ii), and finally to determine a muscle fatigue of the muscle based on the so determined forces $F_1, F_2, F_3, \ldots, F_n$ at step (iii). The number of electrostimulations $n \in \mathbb{N}$ is greater or equal to 2, and comprised, for instance, between 2 and 50. Preferably, the number n is equal to 2, 3, 4 or 5. More preferably, the number n is equal to 2.

Electrostimulations of step (i) are performed at an electric charge E, corresponding to an electric intensity of pulses of which is made any of these electrostimulations. The electric charge E is typically comprised between 10 and 100 mA.

In order to use an electric charge E allowing to perform an accurate and reliable forces determination at step (ii) and muscle fatigue determination at step (iii), the method comprises steps (a) to (d) as described hereabove. In step (a), an initial electric charge $E_0$ is set, e.g., 15 mA, 20 mA or 25 mA. This electric charge is chosen as a medium electric charge convenient for a wide class of the subjects in order to execute reliably steps (i) to (iii). Step (a) also proposes to set a muscular forces target interval 1. Preferably, the interval I is an interval of the form [L, +∞[ or ]L, +∞[, with L a lower bound, e.g., 5N, as detailed in the subject matter disclosure.

As illustrated in FIG. 1, the electric charge $E=E_0$ is used to define and perform an electrostimulation of the muscle with an isolated pulse at step (b) and to determine a (maximal) force F developed by the muscle in response to the electrostimulation of step (c). If $F \in I$, step (i) is executed with $E=E_0$ as initially set. If not, through a step (d), the electric charge E is modified as E' and steps (b) to (c) are re-executed with the new electric charge E, providing a new force F determination, and a re-evaluation of the condition $F \in I$ via step (d). In particular E corresponds to a recursive parameter, which is recursively modified by modifications abstractly noted E' till the condition $F \in I$ is satisfied as it is fully explained in the subject matter disclosure.

Figure 3:
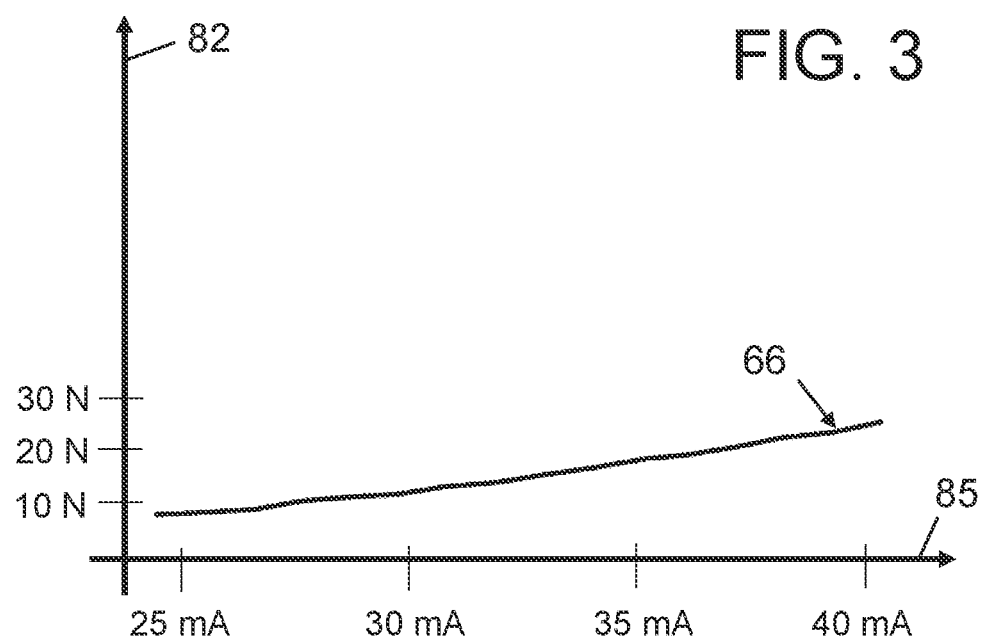
FIG. 3 illustrates an experimental curve of forces measured at step (c) of the method according to a representative embodiment of the present disclosure depending on the electric intensity of the isolated pulse of step (b)

Advantageously, as it is shown in FIG. 3, the curve 66 representing experimental measurements of any such force F determined at step (c) (read in Newton on an axis 82) at varying electric charges (read in mA on an axis 85) is substantially linear, at least for electric charges in a range of interest for the recursion of steps (b) to (d). Indeed, in most of the situations, the electric charge used at the first occurrence of step (i) will be comprised between 25 and 40 mA. As a consequence, it may be easy to determine the modified electric charge E' at step (d), simply by applying to the current electric charge E a proportion induced by the curve gradient. As the latter may depend on the muscle, it is obtained by a ratio of a reference force (preferably L, or L+½N, or L+1N) to the force F lastly determined at step (c).

A time duration T for the muscle to develop the force F determined at step (c) is determined at least at the last occurrence of step (c) preceding the first occurrence of step (i), and optionally at each of the preceding occurrence of step (c) if any. This time duration if saved as $T_0:=T$ if $F \in I$ as illustrated in FIG. 1.

Figure 2:
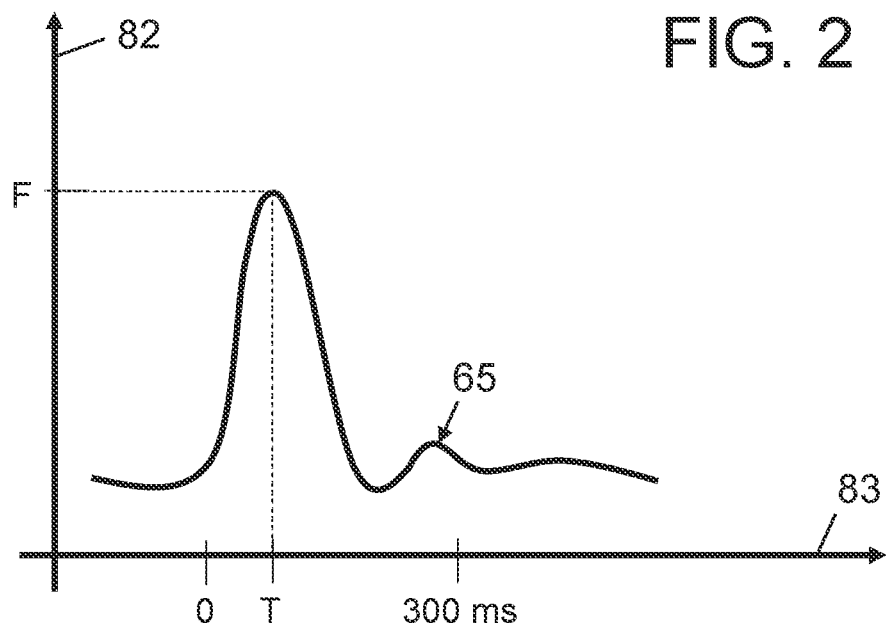
FIG. 2 illustrates a continuous experimental force measurement as a function of time during an execution of step (b) of the method according to a representative embodiment of the present disclosure.

FIG. 2 shown a continuous force measurement (read in Newton on axis 82)—and not only the maximal force F determined at step (c)—as a function of time (read in ms on an axis 83) during an execution of step (b). In particular, the curve 65 following from this measurement corresponds to the response of the muscle to an isolated pulse at the current electric charge E. This response is called a "twitch". The time 0 corresponds to the moment at which the pulse is applied at level of the muscle. As it can be observed from the curve 65, the force F is reach after the time duration T generally comprised between 50 and 100 ms. The force developed by the muscle progressively decreases till the muscle returns to normal conditions, without any contraction or residual force developed due to the electrostimulation by the isolated pulse. Such normal conditions are in particular almost reached after 180 ms, and mainly reached after 300 ms.

In order to further increase the method accuracy and reliability, steps (i) to (iii) are iterated with increasing electric charge as explained hereabove and shown in FIG. 1. The electric charge E is firstly increased as E+ at a substep (iv.1). Then, steps (b) and (c) are executed with this electric charge E (still written as a current electrostimulation parameter) at a substep (iv.2), so that a force F and a time duration T are newly determined at step (c) with this updated electric charge. The time duration T is preferably compared with $T_0$ at a substep (iv.3), and a new iteration of steps (i) to (iii) is preferably executed as a substep (iv.4) only if $T-T_0 \approx 0$ (e.g., $|T-T_0|<5$ ms) for ensuring that recruited muscle fibers over repeated executions of step (i) remained homogeneous in terms of slow and fast muscle fibers.

The muscle fatigue determination at each occurrence of step (iii) can be performed for example by ratio computation of two forces $F_1$ and $F_2$ and/or discrete integral computation on the function associating $F_j$ to $\mu_j$ for $1 \leq j \leq n$, and comparison of at least one of these computations to at least one expected value.

Figure 4:
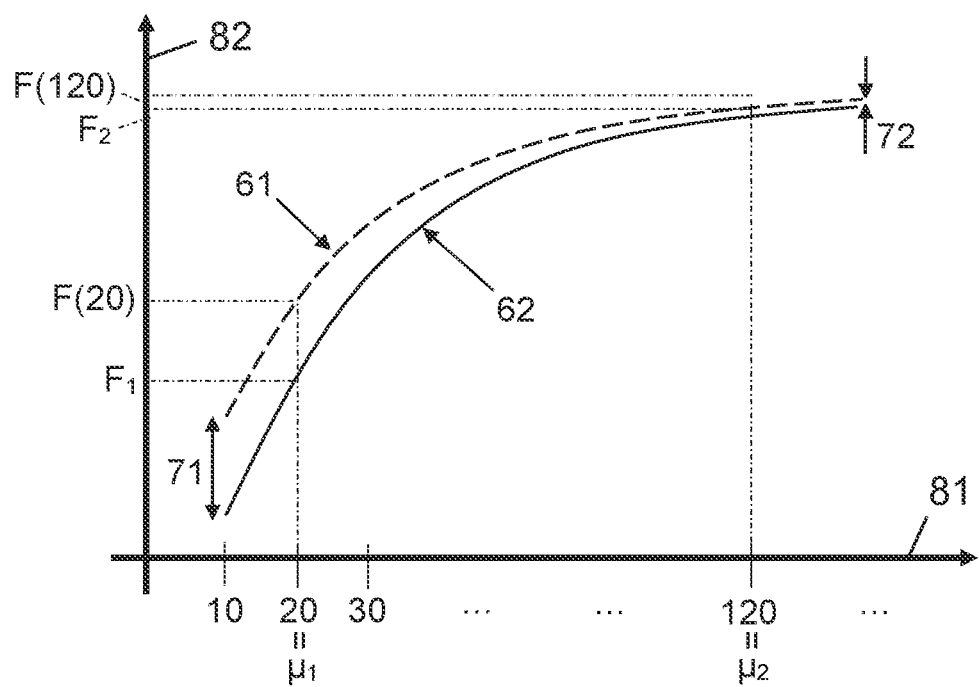
FIG. 4 illustrates curves of the (global and/or maximal) force developed by a muscle in response to an electrostimulation of step (i) at a frequency as a function of this frequency.

FIG. 4 represents graphs of the (maximal) force developed by the muscle (read in Newton on the axis 82) in response to the electrostimulations as a function of the frequency (read in Hertz on an axis 81). In other words, each point of each graph represents the force that can be determined at step (ii) in response to an electrostimulation at one of the frequencies of step (i). The curve 61 corresponds to the graph of a theoretical expected function F expressing a force developed by a non-fatigued muscle in response to such electrostimulations as a function of possible electrostimulation frequencies. The curve 62 represents a continuous and regular extension of dots cloud corresponding to the points $(\mu_1, F_1)$, $(\mu_2, F_2)$, $(\mu_3, F_3)$, ..., $(\mu_n, F_n)$ as measured for a fatigued muscle. It is noticed that the space between the two curves 61 and 62 is greater above low frequencies (e.g., between 10 and 40 Hz), than above high frequencies (e.g., greater than 90 Hz). This space corresponds to differences 71 and 72 between measured forces for the muscle and expected forces from function F for a non-fatigued muscle respectively at low and high frequencies. In particular, the difference 72 is so small that it can be assumed that the two curves 61 and 62 are substantially the same for high frequencies.

If it is assumed that the ratio F(20)/F(120) is either theoretically or practically known as being 65%, it is sufficient to measure the forces $F_1$ and $F_2$ in response to electrostimulations at $\mu_1=20$ Hz and $\mu_2=120$ Hz respectively for determining the muscle fatigue. Indeed, as $F_2$ corresponds substantially to F(120), the measure of $F_2$ corresponds in some sense to a reference measure while the measure of $F_1$ allows to highlight a divergence with expected value in term of ratio to $F_2$. In particular, when the ratio $F_1/F_2$ differs significantly from 65%, a muscle fatigue is deemed to be determined according to the method and can be quantified. This value of about 65% for the ratio is indicative and not limitative. Other values such as about 75% or 85% can also be convenient depending on the considered function F. Similarly, the values of $\mu_1$ and $\mu_2$ are completely not limitative. For instance, an identical discussion can be drawn up with $\mu_2=100$ Hz in place of 120 Hz.

Figure 6:
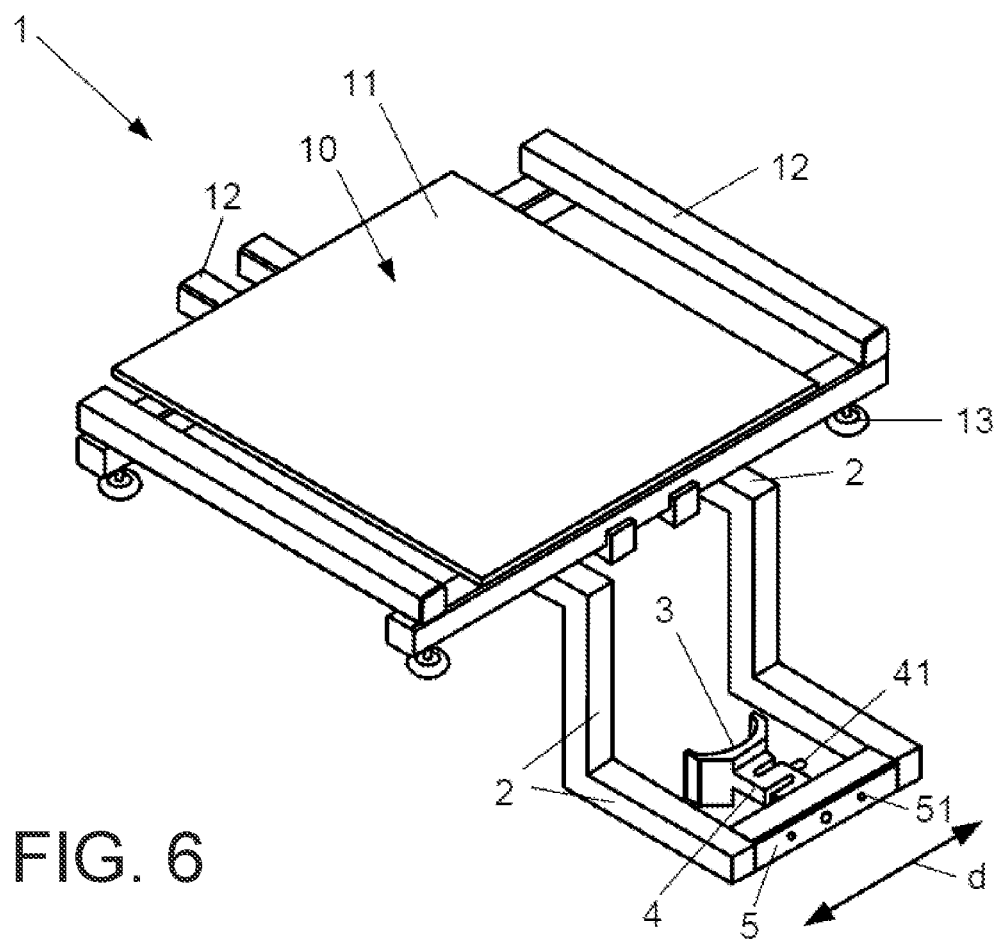
FIG. 6 illustrates a muscular force measuring device in a system for implementing a representative embodiment of the disclosed method.

A muscular force measuring device 1 for measuring the forces $F_1$, $F_2$, $F_3$, ..., $F_n$ for a lower limb muscle is illustrated in FIG. 6. This is preferably part of a whole system adapted to implement the method as described in the subject matter disclosure.

The device 1 comprises a seat 10 comprising a smooth portion 11 for receiving the human in a seated position, a rigidity frame 12 for the smooth portion 11, and positioning lower members 13 for removal positioning the seat on a horizontal support. The rigidity frame 12 contributes to the rigidity of the seat 10, in particular at level of the smooth portion 11 which can be made of a flexible and/or padded material for the human comfort. The positioning lower members 13 can be adjustable in height from 0 to 1/20 meter below the smooth portion 11 for improving the stability of the seat 10 on the horizontal support. They can be suction cups. They can have protected extremities. They are not arranged for being placed on a ground because another part of the device 1 extend much lower than them.

The device 1 comprises a leg support element 3 fixed to the seat 10 by means of a mechanical structure 2 as illustrated. The latter is in particular a mechanical frame in the device 1 illustrated on FIG. 6. The leg support element 3 includes a semi-cylindrical hollow portion for receiving and at least partially immobilizing a lower part of the lower limb leg. A measuring instrument 4 is also provided for measuring any force developed by the muscle at level of the leg support element 3 when it is received and maintained by the latter, in particular in response to the electrostimulations. The mechanical structure 2 also comprises a connecting member 5 to the measuring instrument 4 at level of the leg support element. In particular, in the illustrated configuration of FIG. 6, the measuring instrument 4 is a strain gauge fixed along a first direction in sandwich between the leg support element 3 and the connecting member 5.

The strain gauge comprises a connecting extremity 41 for connecting the device 1 with a non-represented logical unit, i.e., a computer, of the disclosed system. The latter is configured for determining a muscle fatigue on basis of at least some of the forces $F_1$, $F_2$, $F_3$, ..., $F_n$ determined by the device 1 in response to the electrostimulations at each of the frequencies $\mu_1, \mu_2, \mu_3, \ldots, \mu_n$.

The connecting member 5 comprises a position adjustment element 51 for changing the position the leg support element 3 and the measuring instrument 4 with respect to the mechanical structure 2, along a second direction d being perpendicular to the above-mentioned first direction.

Let $I_0$ as being the electric intensity corresponding to the electric charge E defined from steps (a) to (d), or in other words, the electric intensity to be used for the first occurrence of step (i). This electric intensity is preferably comprised between 10 and 50 mA and is typically about 25 mA. Let consider a charge step S between +0.1 mA and +5 mA, preferably of about +1 mA. Let K being an integer (so called "number of occurrences") comprised between 5 and 30, preferably of about 10 or 15. Then, an execution of steps (i) to (iv) of the method according to representative embodiments of the disclosed subject matter comprises the following steps:

successively for each integer k between 0 and K:
electrostimulating the muscle at a first frequency $\mu_1$ (preferably of (about) 20 Hz), with a repetition of $N_1$ pulses during a period of time $T_1$ lower than 250 ms, the pulses having a constant duration and an intensity of $I_0+k$ S;
determining a (maximal) force $F_1$ developed by the muscle in response to this electrostimulation;
waiting for a first rest period $R_1$ comprised between 300 ms and 5 s, preferably of (about) 1 second;
electrostimulating the muscle at a second frequency $\mu_2$ (preferably of (about) 120 Hz), with a repetition of $N_2$ pulses during a period of time $T_2$ lower than 250 ms, the pulses having a constant duration and an intensity of $I_0+k$ S;
determining a (maximal) force $F_2$ developed by the muscle in response to this last electrostimulation;
determining at least one muscle data information, preferably a muscle fatigue of the muscle, on basis of the determined forces $F_1$ and $F_2$;
waiting for a second rest period $R_2$ comprised between 330 ms and 10 s, preferably of (about) 5 seconds.

Substeps (iv.2) and (iv.3) are not mentioned hereabove but they can obviously be integrated in the preceding list of steps as described previously in the subject matter disclosure and in the detailed description.

It can be noticed that the formula $T_1=N_1/\mu_1$ and $T_2=N_2/\mu_2$ makes the links between the number of pulses, the time duration of an electrostimulation and the frequency of electrostimulation. In particular, preferably, $N_1$ is (about) 5 for $\mu_1$ being (about) 20 Hz and $N_2$ is (about) 18 for $\mu_2$ being (about) 120 Hz. These pulses numbers allows to reach said maximal forces $F_1$ and $F_2$ while allowing the electrostimulation times $T_1$ and $T_2$ to be bounded by 250 ms to avoid voluntary perturbation of the forces measurements. For example, if it is considered $N_2$ as being 25, $T_2$ is still below 250 ms, but the (maximal) force $F_2$ will remain substantially unchanged in comparison to the one for $N_2$ being 18. These values of $N_1$ and $N_2$ were in particular experimentally derived by the inventors as a suitable embodiment of the present disclosure associated to the above-mentioned values of $\mu_1$ and $\mu_2$.

Figure 5:
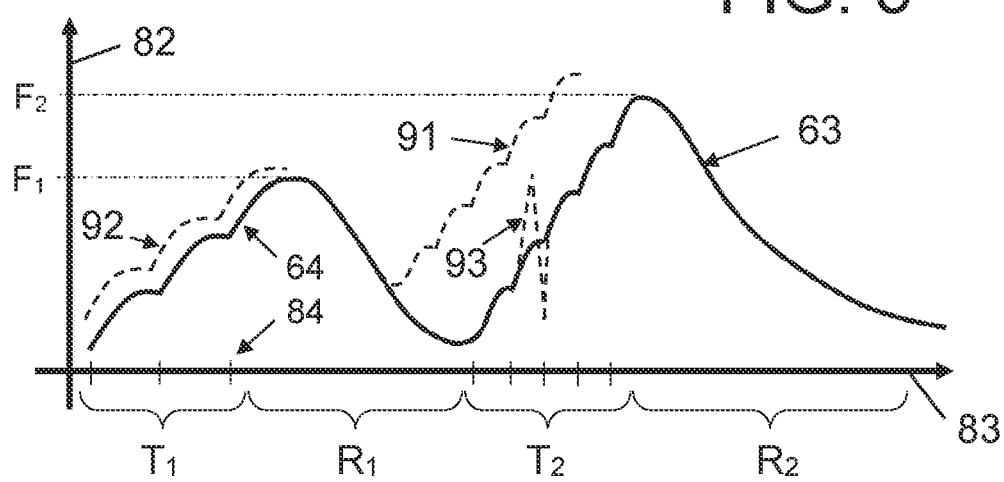
FIG. 5 illustrates a continuous experimental force measurement as a function of time during an execution of step (i) of the method according to a representative embodiment of the present disclosure.

FIG. 5 illustrates a purely schematic curve 63 of continuous forces (typically contraction forces) developed of a human lower limb muscle (read in Newton on axis 82)—and not only the maximal forces $F_1$ or $F_2$ determined at step (c)—as a function of time (read on an axis 83) during part of an execution of the disclosed method according the previously introduced representative embodiments.

In particular, this figure illustrates the electrostimulation effects for an arbitrary k, comprising then a whole execution of step (i). It can easily be derived that the curve 63 repeat similarly itself after the second rest period $R_2$ for each occurrence of step (i), i.e., for each k. If substeps (iv.2) is comprised in the considered embodiments, a curve similar to above-mentioned curve 65 of FIG. 2 is simply interposed continuously between to similarly repeating curves 63. Each curve similar to curve 65 is restricted on the interval [0, $R_3$] of axis 83, where R3 is a third rest period comprised between 300 ms and 5 s, and preferably of (about) 1 second.

The notations $T_1$, $R_1$, $F_1$, $T_2$, $R_2$, $F_2$ introduced above apply similarly to FIG. 5. Similar to the curve 65, the curve 63 is based on experimental measurements. It is reproduced schematically without representing explicit experimental data. In addition, axis 82 and 83 on FIG. 5 are not necessarily endowed with a linear scale. In particular, for the sake of clarity the numbers $N_1$ and $N_2$ corresponding to the illustration of FIG. 5 are respectively 3 and 5, and the periods of time $T_1$, $R_1$, $T_2$ and $R_2$ are not proportionally scaled on axis 83.

It is visible on FIG. 5 that the muscle is electrostimulated at the first frequency $\mu_1$, with a repetition of 3 pulses during a period of time $T_1$ lower than 250 ms, the pulses having a constant duration and an intensity of $I_0$+k S. Each pulses generation corresponds to a bar 84 on the time axis 83. The effect of the pulses on the curve 63 is noted by 64 and is clearly visible as a contraction of the muscle, and then a progressive increase of the force developed by the muscle by a muscular tetanic process. In otherwords, as the pulses generated 84 are close enough, a kind of fusion of the muscular effect of each individual pulse is observed along the period of time $T_1$, providing then such a staircase shaped portion of the curve 63 above the period of time $T_1$.

The same discussion applies for the electrostimulation of the muscle at step (i) at the second frequency $\mu_2 > \mu_1$, with a repetition of 5 pulses during a period of time $T_2$ lower than 250 ms, the pulses having the same constant duration and intensity of $I_0$+k S.

Each of these electrostimulations at frequencies $\mu_1$ and $\mu_2$ during the respective periods of time $T_1$ and $T_2$ allows to reach and determine a maximal force, respectively $F_1$ and $F_2$, developed by the muscle in response to the electrostimulation, as it is visible on axis 82 of FIG. 5, and consecutively to determine a muscle fatigue at step (iii). As it is visible on FIG. 5, the first and second rest periods $R_1$ and $R_2$ are long enough to allow the muscle to return to "normal" and/or "relaxed" conditions, without any contraction or residual force developed due to the preceding electrostimulation, and this before the beginning of the next electrostimulation. In other words, the rest periods $R_1$ and $R_2$ allow the curve 63 to return to a baseline. The rest period $R_1$ occurs between the electrostimulations at the frequencies $\mu_1$ and $\mu_2$ with the same pulse intensity of the form $I_0$+k S. The rest period $R_2$ occurs between the electrostimulation at the frequency $\mu_2$ with a pulse intensity $I_0$+k S and the electrostimulation at the frequency $\mu_1$ with a pulse intensity $I_0$+(k+1) S (or the isolated pulse with a pulse intensity $I_0$+(k+1) S if substep (iv.2) is applied).

As explained in the present disclosure, this method is convenient for avoiding disturbance effects on the determination of the forces $F_1$ and $F_2$. FIG. 5 illustrates also in dot lines examples of effects of such disturbances 91, 92 and 93 on the curves 63. Those are purely fictional as the method is specifically conceived for avoiding them.

Disturbance 91 shows an example of a tetanic effect on the curve 63 due to a non-respect of the above discussed lower bounds for the first rest period $R_1$. If this period does not last enough, the muscle is still contracted and not relaxed when the next electrostimulation starts, which affects the measure of $F_2$ as being too high due to the partial (tetanic) fusion of the effect of the electrostimulations at the frequencies $\mu_1$ and $\mu_2$. If the fusion is partial and very limited (i.e., for $R_1$ greater than 115 ms), it is nevertheless possible to apply a direct mathematical treatment (e.g., by linear interpolation) to determine force $F_2$ from the observed disturbed curve 91. A similar discussion can obviously apply for the second rest period $R_2$.

Disturbance 92 shows an example of a potentiation effect on the curve 63, above the time period $T_1$ (but the skilled person would easily understand that such effect is not limited above this time period). By not increasing the pulse intensity by a charge step S between consecutive occurrences of step (i), the muscle becomes potentiated, and then the real force $F_1$ is disturbed, in particular higher than it should, due to a kind of training of the muscular fibers. The increasing of the intensity between consecutive occurrences of step (i) according to the present disclosure allows to avoid such potentiation effect.

Finally, disturbance 93 shows an example of a voluntary and/or reflex muscular contraction by the subject in parallel to an electrostimulation. The subject increases the force at a pulse generation and decreases it between or after the pulses. Advantageously, such disturbance cannot occur given that the time periods $T_1$ and $T_2$ are so short (at most 500 ms, preferably less than 250 ms) than the subject cannot react by himself during an electrostimulation.

It will be easily understood by the skilled person that the number n of electrostimulations for the class of embodiments is equal to 2, but that these embodiments can easily be generalized to any number n>1.

In other words, the above detailed disclosed subject matter relates to a muscle fatigue determination method including a step of electrostimulating a muscle at an electric charge at different frequencies. Said electric charge is determined recursively in order to generate reliable and accurate forces of the muscle in response to the electrostimulation. The method further includes the steps of determining these forces and a muscle fatigue based on them.

The disclosed subject matter has been described above in relation to the specific embodiments which have a value that is purely illustrative and should not be considered to be limiting. The skilled person will notice that the disclosed subject matter is not limited to embodiments that are illustrated and/or described here above. The disclosed subject matter comprises each of the new technical characteristics described in the present document, and their combinations.

All the embodiments and advantages of the method applies mutatis mutandis to the aforementioned sport activity planning method.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

While illustrative embodiments have been illustrated and described, it will be appreciated that various changes can be made therein without departing from the spirit and scope of the invention.

The invention claimed is:

1. A method for determining a muscle fatigue of a muscle, the method comprising the following steps in the following order:
   (a) setting an electric charge and a muscular forces target interval;
   (b) inducing a single twitch contraction in the muscle by electrostimulating the muscle with an isolated pulse at the electric charge, wherein electrostimulation of the muscle is performed by a stimulator;
   (c) measuring a force developed by the single twitch contraction of the muscle induced in step (b);
   (d)
   (d.1) determining a ratio of a reference force of the muscular forces target interval to the force measured at the step (c),
   (d.2) modifying the electric charge such that a ratio of a modified electric charge to the electric charge of the step (b) corresponds to the ratio of the reference force to the force measured at the step (c), and
   (d.3) repeating the steps (b) to (d) until the force measured at the step (c) is within the muscular forces target interval;
   (e) electrostimulating the muscle at the electric charge at different frequencies;
   (f) measuring forces developed by the muscle in response to the electrostimulations of the step (e); and
   (g) determining the muscle fatigue on basis of the forces measured at the step (f),
   wherein the stimulator includes an electrical pulse generator, electrodes attached to the generator and configured to be placed on a skin of a subject, and a controller configured to selectively control the electric charge and frequency of the electrical pulses according to the steps (b) through (e).

2. The method according to claim 1, wherein the electric charge is defined by an electric intensity of pulses constituting electrostimulations, so that the modification of the electric charge at the substep (d.2) corresponds to a modification of the electric intensity.

3. The method according to claim 1, wherein the reference force is chosen among: a lower bound or an upper bound of the muscular forces target interval, said lower bound increased by a force step, or said upper bound decreased by a force step.

4. The method according to claim 1, wherein the modification of the electric charge is determined at the substep (d.2) by the formula E'F=E F', wherein:
   E is the electric charge,
   E' is the modified electric charge to be determined,
   F is the force measured at the step (c), and
   F' is the reference force.

5. The method according to claim 1, wherein the step (c) and (f) are performed by a measuring instrument arranged for measuring the forces to be measured at the steps (c) and (f), and wherein the electric charge and/or the muscular forces target interval are set at the step (a) depending on the muscle and/or on at least one technical feature of the measuring instrument.

6. The method according to claim 1, wherein:
   the electric charge set at the step (a) is comprised between 10 and 40 mA, and/or
   a lower bound of the muscular forces target interval set at the step (a) is comprised between 2 and 10 N.

7. The method according to claim 1, comprising a number of occurrences of the following step after the step (g):
   (h) (h.1) increasing the electric charge by a charge step;
   (h.4) repeating the steps (e) to (g).

8. The method according to claim 7, wherein the step (h) comprises the following substep between the substeps (h.1) and (h.4):
   (h.2) executing the steps (b) and (c).

9. The method according to claim 8, wherein the step (c) further comprises determining a time duration for the muscle to develop the force in response to the electrostimulation of the step (b).

10. A method for determining a muscle fatigue of a muscle, the method comprising the following steps in the following order:
    (a) setting an electric charge and a muscular forces target interval;
    (b) inducing a single twitch contraction in the muscle by electrostimulating the muscle with an isolated pulse at the electric charge, wherein electrostimulation of the muscle is performed by a stimulator;
    (c) measuring a force developed by the single twitch contraction of the muscle induced in step (b) and determining a time duration for the muscle to develop the force in response to the electrostimulation of the step (b);

(d) if the force measured at the step (c) does not belong to the muscular forces target interval;
  (d.1) comparing the force measured at the step (c) with the muscular forces target interval,
  (d.2) modifying the electric charge depending on the comparison of the substep (d.1), and
  (d.3) repeating the steps (b) to (d);
(e) electrostimulating the muscle at the electric charge at different frequencies;
(f) measuring forces developed by the muscle in response to the electrostimulations of the step (e);
(g) determining the muscle fatigue on basis of the forces measured at the step (f); and
(h) (h.1) increasing the electric charge by a charge step;
  (h.2) executing the steps (b) and (c);
  (h.3) comparing the time duration determined at the occurrence of the step (c) originating from the preceding substep (h.2) to the time duration determined at the last occurrence of step (c) preceding the first occurrence of the step (e); and
  (h.4) repeating the steps (e) to (g),
  wherein the stimulator includes an electrical pulse generator, electrodes attached to the generator and configured to be placed on a skin of a subject, and a controller configured to selectively control the electric charge and frequency of the electrical pulses according to steps (b) through (e).

11. The method according to claim 10, wherein the execution of the method is stopped after any occurrence of the substep (h.3) following which the time durations compared at the substep (h.3) deviate from at least 10 ms.

12. The method according to claim 7, wherein each electrostimulation of the step (e) at each frequency comprises a repetition of pulses with an electric intensity comprised between 10 and 100 mA, wherein the increasing of the electric charge at the substep (h.1) corresponds to an increasing of the electric intensity of the pulses, and wherein the charge step is comprised between +0.5 and +5 mA.

13. The method according to claim 7, wherein the number of occurrences of the step (h) is comprised between 5 to 30.

14. The method according to claim 1, wherein each electrostimulation of the step (e) at each frequency is preceded and/or followed by a rest period of at least 300 ms.

15. The method according to claim 1, wherein each electrostimulation of the step (e) at each frequency lasts at most 500 ms.

16. The method according to claim 1, wherein the frequencies of the step (e) comprise:
  a first frequency comprised between 0 and 50 Hz, and
  a second frequency comprised between 50 and 200 Hz, the first frequency differing by at least 10% from the second frequency;
  wherein the forces measured at the step (f) comprise:
  a first force developed by the muscle in response to the electrostimulation of the step (e) at the first frequency, and
  a second force developed by the muscle in response to the electrostimulation of the step (e) at the second frequency;
  and wherein the step (g) comprises the following substeps:
  (g.1) computing a ratio of the first force to the second force,
  (g.2) comparing the ratio computed at the substep (g.1) to a threshold, and
  (g.3) determining the muscle fatigue on basis of the comparison of the substep (g.2).

17. The method according to claim 1, wherein the muscle fatigue is a long-lasting peripheral muscle fatigue.

18. A method for planning a sport activity, comprising the following steps:
  (0) identifying a muscle to be stimulated during the sport activity;
  (1) executing the method according to claim 1 for determining a muscle fatigue of the muscle identified at the step (0); and
  (2) planning the sport activity on basis of the muscle fatigue determined at the step (1).

19. The method according to claim 1, wherein the muscle is a lower limb muscle of a human, and wherein the method further comprises the following steps, before the step (a):
  (α) providing a system comprising:
    a stimulator configured to generate the electrostimulations of the steps (b) and (e), the stimulator comprising a controller for selecting electrostimulations parameters;
    a muscular force measuring device comprising:
      a seat adapted to receive the human in a seated position and to be positioned on a horizontal support,
      a leg support element adapted to receive and to maintain stable at least part of a leg of the lower limb,
      a measuring instrument adapted to measure the forces to be determined at the steps (c) and (f) at the level of the leg support element in response to the electrostimulations generated by the stimulator at the steps (b) and (e), and
      a mechanical structure mechanically coupling the seat and the leg support element, and comprising a connecting member to the measuring instrument at level of the leg support element;
  (β) positioning the seat on the horizontal support;
  (γ) positioning the human on the seat in the seated position, and positioning at least part of the leg on the leg support element, so that the lower limb is only in direct external physical contact with the muscular force measuring device;
  wherein the electrostimulations of the steps (b) and (e) are generated by the stimulator, wherein the forces determined at the steps (c) and (f) are measured by the measuring instrument, wherein the comparison of the substep (d.1), the modification of the electric charge of the substep (d.2) and the determination of the muscle fatigue of the step (g) is based on the electric charge and the muscular forces target interval set at the step (a) and on the forces measured by the measuring instrument at the steps (c) and (f);
  and wherein the muscular force measuring device remains stationary with respect to the horizontal support during an execution of the steps (b), (c), (e) and (f) based on a whole weight of the human exerted at level of the seat.

* * * * *